United States Patent [19]
Cook

[11] Patent Number: 4,642,614
[45] Date of Patent: Feb. 10, 1987

[54] FLUID FLOW MONITORING SYSTEM
[75] Inventor: John F. Cook, St. Louis County, Mo.
[73] Assignee: McNeil Corporation, St. Louis, Mo.
[21] Appl. No.: 850,946
[22] Filed: Apr. 11, 1986

Related U.S. Application Data
[63] Continuation of Ser. No. 565,718, Dec. 27, 1983, abandoned.

[51] Int. Cl.$^4$ .............................................. G08B 21/00
[52] U.S. Cl. ...................................... 340/608; 340/606; 340/682; 137/552
[58] Field of Search ................ 137/552, 558; 184/6.4; 340/606, 608, 622, 679, 682

[56]  References Cited
U.S. PATENT DOCUMENTS

| | | | |
|---|---|---|---|
| 3,123,745 | 3/1964 | Cook | 361/166 |
| 3,678,631 | 7/1972 | Payne et al. | 184/6.4 X |
| 4,101,001 | 7/1978 | Smith | 184/6.4 |
| 4,186,821 | 2/1980 | Wegmann | 184/7.4 |
| 4,354,183 | 10/1982 | Weeks et al. | 340/682 |

Primary Examiner—James L. Rowland
Assistant Examiner—Brian R. Tumm
Attorney, Agent, or Firm—Senniger, Powers, Leavitt and Roedel

[57]  ABSTRACT

A system for monitoring flow of lubricant in a line in a lubrication system wherein, in normal operation, lubricant is intermittently delivered through the line, the system comprising a thermistor in the line adopted to be cooled by lubricant flowing in the line, a timer for intermittently timing out periods during each of which a delivery of lubricant should occur, and a monitoring circuit which includes a fault signal actuated at the termination of any period in which a normal flow of lubricant has not occurred and the thermistor accordingly has not been cooled.

20 Claims, 5 Drawing Figures

FLUID FLOW MONITORING SYSTEM

This application is a continuation of application Ser. No. 565,718, filed Dec. 27, 1983, now abandoned.

BACKGROUND OF THE INVENTION

This invention relates to fluid flow monitoring systems, and more particularly to a system for monitoring intermittent flow of lubricant through a lubricant passage or passages or a lubricant line or lines.

SUMMARY OF THE INVENTION

Among the several objects of the invention may be noted the provision of an improved system of the class described for monitoring flow of fluid through a line, and more particularly flow of lubricant through a lubricant line, wherein in normal operation the fluid (lubricant) is intermittently delivered through the line, as distinguished from flowing continuously through the line; the provision of such a system for monitoring small flows (e.g., the output of a lubricant injector); and the provision of such a system which, for what it accomplishes, is relatively simple, of relatively low cost, and reliable in operation.

In general, a system of this invention for monitoring flow of fluid in a passage in a fluid distribution system wherein, in normal operation, fluid is intermittently delivered through the passage, comprises a thermistor in the passage connected in a circuit for being energized and thereby heated, the thermistor being in heat-exchange relation with fluid flowing in the passage to be cooled thereby for varying its electrical resistance. Means is provided for establishing periods during each of which a normal delivery of fluid should occur through the passage. A monitoring circuit is interconnected with the thermistor and said period-establishing means and has fault signal means therein and means operable in response to occurence of a period without cooling of the thermistor by a normal delivery of fluid during that period to actuate said signal means, said circuit being conditioned in response to cooling of the thermistor by a normal delivery of fluid during a period to refrain from actuating said fault signal means at the termination of said period.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
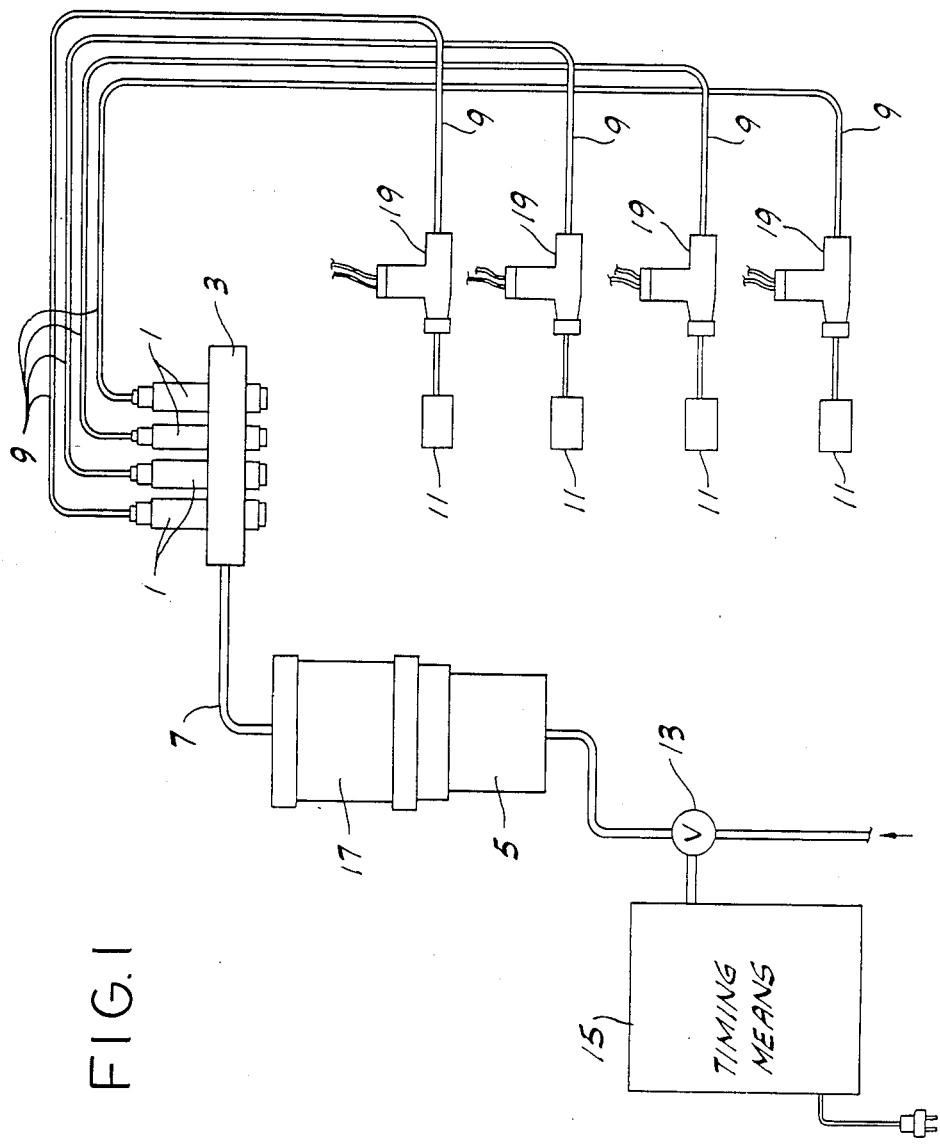
FIG. 1 is a view of a lubrication system including lubricant injectors the flow from each of which is monitored by means of this invention.

Referring first to FIG. 1 of the drawings, a first embodiment of the system of this invention is illustrated for monitoring delivery of lubricant from each of a plurality (e.g., four as illustrated) of lubricant injectors each designated 1. Each of these is of a well-known type such as an SL-32 injector which has been on sale for quite some time by Lincoln St. Louis Division of McNeil Corporation, of St. Louis, Mo., the assignee of this invention and application. The injectors are shown as connected in a lubricant manifold 3 adapted to be supplied with lubricant under pressure from a lubricant pump 5 via a manifold supply line 7. The pump is periodically operated (e.g., once an hour) for a lubricant delivery period (e.g., fifteen seconds) to deliver lubricant under pressure to the manifold. Each injector, having been previously charged with lubricant, functions on build-up of pressure in the manifold to deliver a metered (and small) charge of lubricant through an injector output line or passage 9 to a point of lubrication 11 (e.g. a bearing). On termination of operation of the pump, pressure in the manifold is relieved, and the injectors thereupon recharge for the next cycle. Reference may be made to such U.S. Patents as U.S. Pat. Nos. 2,637,413, 3,609,066 and 3,663,831 for background The pump 5 is an air-operated plunger-type lubricant pump such as shown in U.S. Pat. No. 3,609,066, the supply of air to the pump being controlled by a solenoid valve 13 which is in turn under control of an electrical timing means 15 which may comprise a timer of a well-known type conventionally used for controlling pumping operations in a lubricant injector system. The timing means 15, when energized, functions to intermittently actuate valve 13 to supply air to operate the pump for a timed delivery period for delivery of lubricant under pressure by the pump through line 7 to the injector manifold 3. The pump is supplied with lubricant from a reservoir 17. When the pressure reaches a predetermined value, the injectors deliver their metered charges of lubricant. Following each delivery period, the valve 13 is deactuated for an off period, and during this off period the pressure in the manifold 3 drops and the injectors recharge.

For monitoring flow thorugh the lines 9 to determine whether there has been normal flow or not, each of these lines 9 has a fitting 19 connected therein, each of these fittings having a thermistor 21 therein (see FIG. 2) for detecting a normal flow or delivery of lubricant through the respective line 9. The thermistor is connected as indicated at 23 in a circuit (FIG. 4) for being energized and thereby heated, and is in heat-exchange relation with lubricant flowing thereover in the respective fitting 19 to be cooled thereby. Its resistance varies inversely with its temperature, i.e., its resistance increases on cooling. Under no-flow conditions, the temperature of the thermistor rises and its resistance decreases. The timing means 15, when turned on, functions intermittently to operate the pump 5 for timed delivery periods for delivery of lubricant from the reservoir 17 supplying the pump, each delivery period being followed by an off period of no flow, the off periods alternating with the delivery periods. During each off period of no-flow, the lubricant in the vicinity of the thermistor is warmed by the thermistor. On delivery of lubricant by the pump the warm lubricant is displaced by cooler lubricant.

Normally, an injector 1 delivers lubricant through the respective injector output line 9 to a bearing 11 each time the pump is activated. It happens at times that a fault occurs in a line and there is a failure of delivery through a line 9, and it is important to sense and signal this for timely effecting appropriate correction. The system of this invention senses the occurrence of delivery of lubricant through line 9 in normal operation by cooling of the thermistor 21 in the line by the flow, with consequent increase in its electrical resistance, and senses absence of normal flow by remaining heated and thereby remaining of lower electrical resistance.

Figure 4:
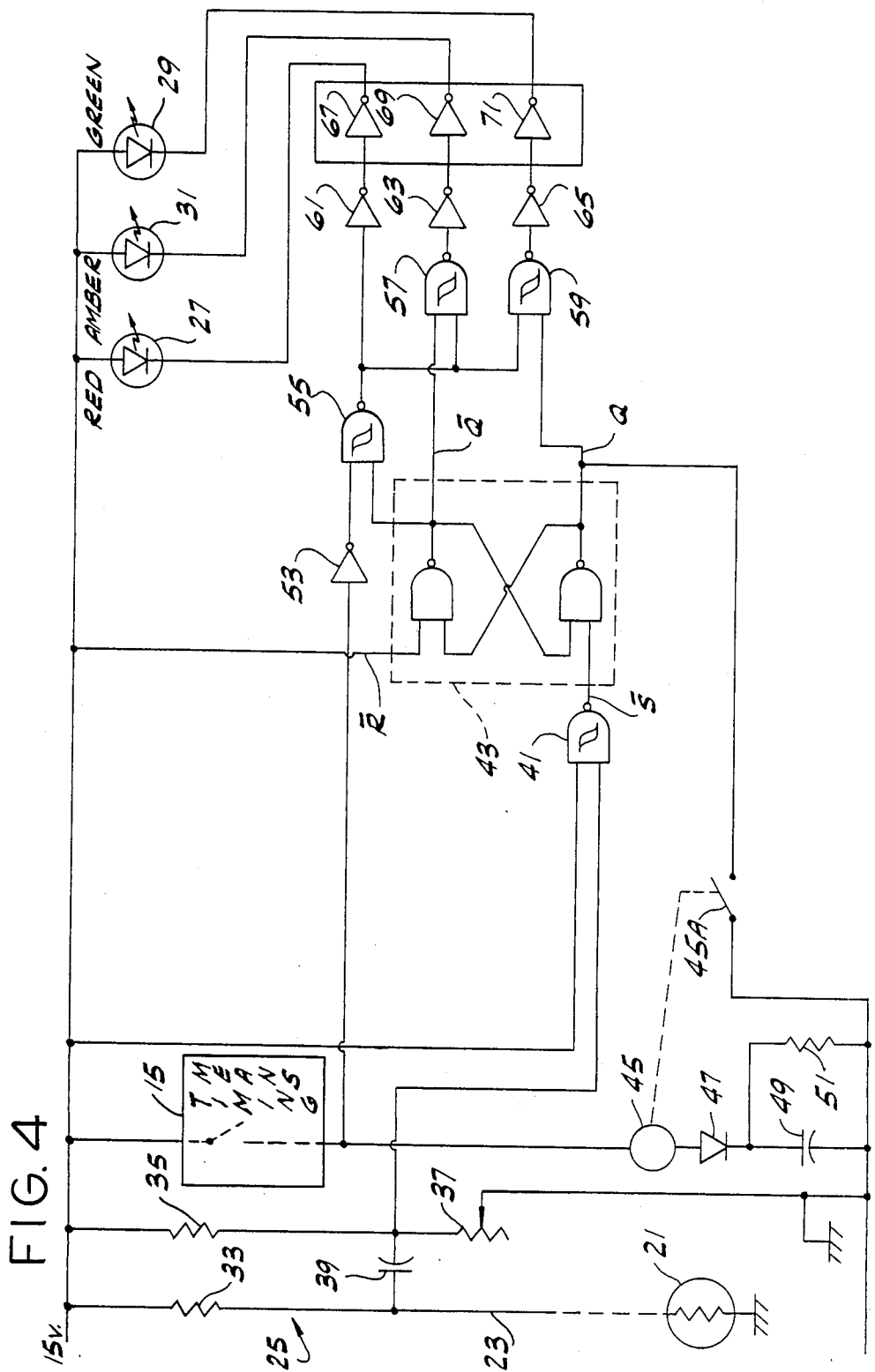
FIG. 4 is a circuit diagram.

A monitoring circuit generally indicated at 25 in FIG. 4 interconnected with the thermistor 21 and the timing means 15 includes fault signal means, more particulary a visual signal means 27, which is actuated on termination of any pumping (delivery) period during which lubricant has failed to flow normally through the respective line 9 and hence during which the thermistor has not been cooled by a normal flow of lubricant through the line. The circuit is conditiond in response to cooling of the thermistor 21 by a normal flow of lubricant through the line during any of the stated pumping (delivery) periods to refrain from actuating the fault signal means at the termination of that period.

The monitoring circuit 25 further includes a second signal means, more particularly a second visual signal means 29 for signaling that a normal flow of lubricant has occurred during a delivery period (the pumping period timed by timing means 15), the circuit being conditioned to actuate this second signal means in response to resistance change caused by cooling of the thermistor 21 by a normal flow during said pumping period.

The monitoring circuit 25 still further includes a third signal means, more particularly a third visual signal means 31, for signaling that the timing means 15 is timing out a pumping period (or cycle), the fault signal means 27 (the first of the three signals) being actuated in the absence of cooling of the thermistor 21 by a normal flow of lubricant during any such period as the third signal means 31 is deactuated on termination of that period.

Preferably, the three signal means 27,29, and 31 are all visual signal means, and, also preferably, the first (the fault signal) is a red light, the second (the flow occurrence signal) is a greenlight, and the third (the timing in progress signal) is an amber light. Light emitting diodes (LEDs) are used for lights 27,29 and 31 with advantageous reliability The monitoring circuit 25 of FIG. 4 has the thermistor (or temperature sensitive resistance) 21 connected in a circuit also including resistors 33 and 35 and variable resistor or rheostat 37. Resistor 33 and thermistor 21 form a first voltage divider, and resistor 35 and rheostat 37 form a second voltage divider. These first and second voltage dividers are joined by a capacitor 39. Resistor 33 is selected so that thermistor 21 is heated by an electrical current provided from a nominally 15 volt voltage source through resistor 33 and thermistor 21. Capacitor 39 isolates the d.c. component of voltage across thermistor 21 from the second voltage divider. For example, the resistor 33 can be selected so that the thermistor 21 voltage is set anywhere from about 3 volts to 14 volts. Thus, only relatively rapid changes in thermistor 21 voltage, such as those caused by desired lubricant flow, are coupled through capacitor 30. Rheostat 37 is set so that the output of a Schmitt input NAND gate 41 responds to an increase in voltage across thermistor 21 due to the resistance increasing as it is cooled during normal desired lubricant flow.

The setting of rheostat 37 is advantageously made so as to provide a reference voltage to the input of NAND gate 41. This reference voltage is slightly below the "turn-on" or threshold voltage required for the input of NAND gate 41 to cause the output of NAND gate 41 to change in logic level. When the voltage across thermistor 21 increass, capacitor 39 transmits the increase of voltage to NAND gate 41 so as to briefly add to the previous voltage on rheostat 37 and exceed the threshold voltage. As a result the output of NAND gate 41 changes in level from a logic one to a logic zero. Since the increase of input voltage is relatively small compared to the voltatge change caused at the output of NAND gate 41, a substantial voltage amplification is effectively obtained by such logic device without need of an additional relatively expensive operational amplifier.

The voltage rise across thermistor 21 is coupled through capacitor 39 to NAND gate 41. Because NAND gate 41 has its other input tied to the positive 15 volt voltage source, it acts essentially as an inverter.

During normal lubricant flow, NAND gate 41 couples a logic zero to the S-bar input of a flip-flop 43, setting the output Q high to a logic 1 and the output Q-bar to a logic zero. Output Q is always the opposite of output Q-bar. Flip-flop 43 is a dual NAND gate set-reset (RS) flip-flop with low active set input S-bar and low active reset input R-bar. For an instant after timing means 15 initiates a pumping or lubricating interval, a relay coil 45 is energized by flow of current from the 15 volt source through timing means 15, relay coil 45, diode 47 and the RC circuit 49,51. The closing of relay contacts 45A resets flip-flop 43 so that output Q is zero and Q-bar is a logic one. When capacitor 49 has charged, the relatively high resistance of resistor 51 limits current through relay coil 45 to a value insufficient to hold contacts 45A closed. Contacts 45A open, allowing NAND gate 41 to subsequently set flip-flop 43 so that output Q is a one and output Q-bar is a zero in response to voltage change resulting from the normal lubricant flow. As long as the output of NAND gate 41 remains high, however, flip-flop 43 remains reset with output Q at zero and Q-bar at one.

Flip-flop 43, an inverter 53, and Schmitt input NAND gates 55, 57 and 59 provide a logic network for feeding the red fault signal light 27,the amber delivery period light 31, and the green normal-flow light 29. Inverters 61, 63, 65, 67, 69 and 71 are provided as driving circuits for the LED lights 27, 31 and 29. The hysteresis symbol on the NAND gates 41, 55, 57 and 59 connotes Schmitt inputs for providing a more reliable circuit operation in the presence of slowly varying inputs.

The flip-flop 43 output Q being high represents the condition of normal lubrication (lubricant delivery) during the lubricant pumping interval. The logic network operates so that green light 29 turns on when Q is high. The logic network operates amber light 31 during the interval in which lubricant is flowing (the pumping interval) so that it is providing a visual signal when output Q is low and timing means 15 is conducting Red fault light 27 is on when the timing means 15 is off and the output bar of flip-flop 43 is high.

When proper lubrication has not occurred, there is no output through capacitor 39 from the thermistor 21 sufficient to set flip-flop 43. When the pumping interval is completed and the timing means 15 turns off the pump, the red light 27 is caused to go on by the logic circuit because the output Q-bar is still high from the relay contacts 45A reset operation.

The sequence of operation of the logic circuit is now described in somewhat greater detail. Upon timing means 15 closing, relay coil 45 is energized, closing contacts 45A and resetting flip-flop 43. Contacts 45A reopen immediately. Output Q is low, making the output of NAND gate 59 go high, which turns off green-light 29. Output Q-bar is high, quialifying NAND gates 55 and 57. Because timing means 15 is conducting at this time, inverter 53 provides a logic zero as a low to NAND gate 55, causing the output of NAND gate 55 to go high. This keeps red light 27 off but causes the output of NAND gate 57 to go low, turning the amber light 31 on.

Assume for analysis that normal lubricant delivery occurs, resulting in a high pulse (higher voltage) from thermistor 21 and capacitor 39 to NAND gate 41. The output of NAND gate 41 goes low, setting flip-flop 43. Output Q now goes high, qualifying NAND gate 59. Output Q-bar goes low forcing the output of NAND gate 57 high and turning off amber light 31. Likewise, the output of NAND gate 55 is forced high by the low Q-bar output, keeping the red light 27 off directly through inverters 61 and 67, but turning green light 29 on through NAND gate 59 and inverters 65 and 71.

Alternatively, if lubrication does not occur properly so that thermistor 21 provides no voltage pulse through capacitor 39, then the output of NAND gate 41 remains high and flip-flop 43 is not changed from the reset state which had been provided by relay contacts 45A. Output Q remains low and Q-bar remains high. The amber light 31 remains on until the pumping interval is completely timed out by the timing means 15. The timing means 15 turns off, causing the input of inverter 53 to go low. The output of inverter 53 goes high, qualifying NAND gate 55. Because the output Q-bar is in the reset high state, the output of NAND-gate 55 goes low, turning on the red fault light 27. The low output of NAND-gate 55 drives NAND-gates 57 and 59 high, turning off the amber light 31 and keeping off the green light 29.

Flip-flop 43 acts as a memory element for remembering the operation of the relay coil 45 and its contacts 45A, and for remembering the pulses which are provided by thermistor 21 through capacitor 39 curing normal lubrication. The logic circuitry operates advantageously in that at least one of the lights 27, 31 and 29 is on at any given time. In this way, if all of the lights 27, 31 and 29 are off, the operator can conclude that either the power supply to the circuit has been turned off or that the circuit is malfunctioning. As an additional feature, the logic circuit is constructed so that in this preferred embodiment only one of the lights 27, 31 and 29 is on at any one time. The red light 27 of the green light 29, whichever is turned on by flip-flop 43, advantageously stays on during the relatively long time between lubrication operations, so that operator attention can be given at any convenient time.

Capacitor 39 is of sufficient capacitance so that it provides an adequate voltage pulse to drive the NAND-gate 41 under normal lubricating conditions. Capacitor 39 is small enough capacitor so that changes in voltage, as due to temperature drift or other slowly varying causes, have no significant effect on the circuit operation. In one embodiment the value of capacitor 39 is selected at 3 microfarads. Capacitor 49 has a high enough capacitance so that relay contacts 45A will initially turn on. A value for capacitor 49 of 300 microfarads at 50 WVDC is selected in one embodiment.

Resistor 51 is suitably a 10 K resistor for discharging capacitor 49 after timer 15 goes off.

Figure 2:
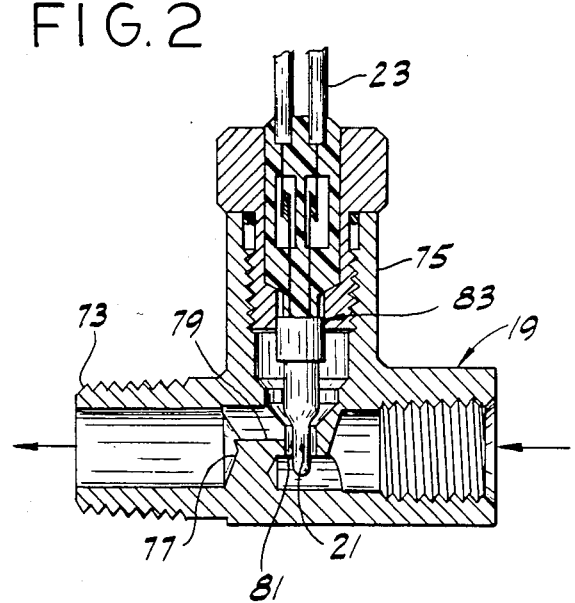
FIG. 2 is a section of a first type of fitting that may be used in the monitoring system of this invention.

FIG. 2 shows the detail of a fitting 19 of the FIG. 1 system. This fitting is what is called a straight fitting, having a straight tubular body 73, lubricant flowing in at one end thereof and out the other, and a tubular stem 75. The body 73 has a baffle 77 including a portion 79 which extends longitudinally of the body having an opening 81 therein. The thermistor 21 is carried by means indicated generally at 83 extending through the stem 75, the thermistor being positioned in the opening for being cooled by lubricant flowing through the opening in a direction generally at right angles to the body.

Figure 3:
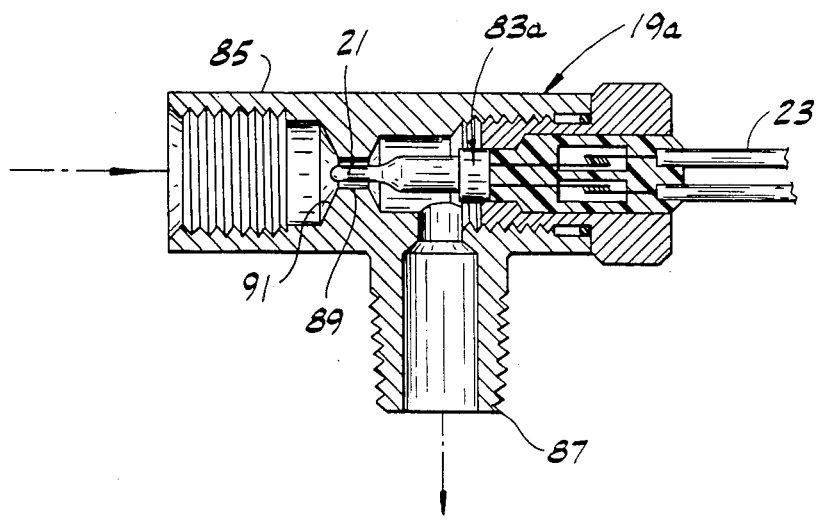
FIG. 3 is a section of a second type of fitting.

FIG. 3 shows the detail of another embodiment 19a of the fitting, this being what is called an L-fitting having a tubular head 85 and a tubular stem 87 at right angles to the head. Lubricant flows in at one end of the head, through an opening 89 on a partition 91 in the head and then turns at right angles and out through the stem 87. The thermistor 21 is carried by means indicated at 83a extending through the head 85 from its other end, the thermistor being positioned in opening 89.

Figure 5:
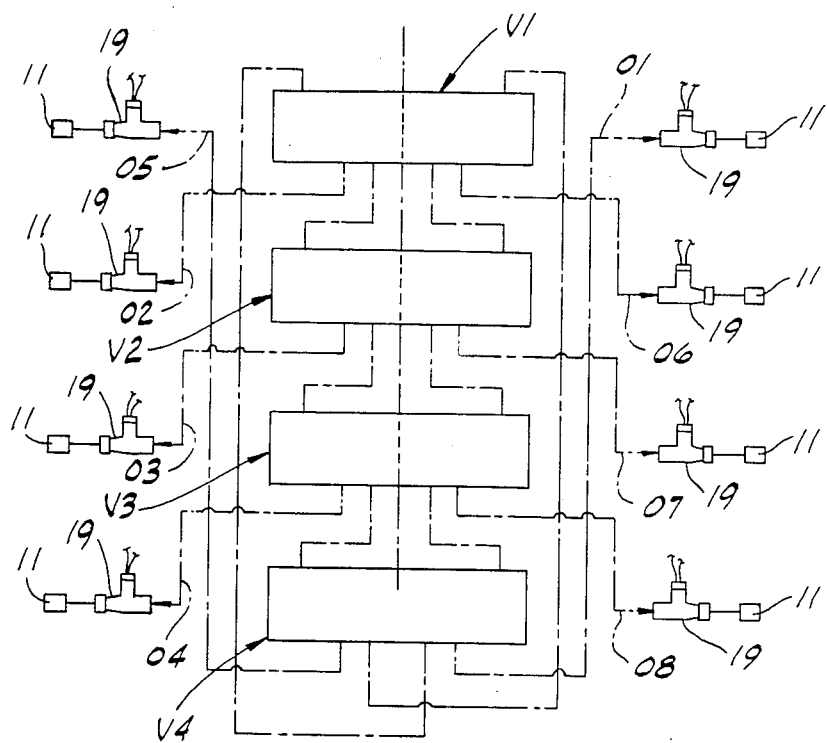
FIG. 5 is a view of a lubrication system including divider valves the flow from which is monitored by means of this invention.

The monitoring system of this invention is applicable to monitoring flow of lubricant in the output lines from a series of divider valves in lubricating apparatus as illustrated in FIG. 5 of the type disclosed, for example, in the co-assigned Wegmann U.S. Pat. No. 4,186,821, issued Feb. 5, 1980. FIG. 5, by way of example, shows four divider valves V1-V4 and eight output lines 01-08 (as in said patent). For monitoring flow in each of these output lines, each line is equipped with a thermistorized fitting such as the fitting 19 (or the alternative shown in FIG. 3). The thermistor of each fitting is connected in a circuit as illustrated in FIG. 4 under control of a timing means similar to 15 which is operable to time out periods corresponding to the length of time of the overall divider valve system cycle so that monitoring of flow in each output line 01-08 is assured. In this regard, it will be understood that the divider valve system is operable in cycles, in each of which the divider valves operate one after another in series, and in each of which lubricant is delivered successively through the output lines, one after another. Thus, for the four divider valves V1-V4 and the eight output lines 01-08 illustrated, on each cycle delivery occurs first through line 01, then line 02 and so on to line 08, and the 01-08 cycle then repeats. The overall time for a cycle may vary widely. Whatever the cycle time may be, the timing means is set to time out periods corresponding to (preferably greater than) the cycle time so that flow of lubricant through all of the (eight) fittings with its accompanying thermistor cooling and thermistor resistance change is certain to occur during each established period, thereby to assure monitoring of flow in each line.

In the two illustrated embodiments of the invention, the timing means (e.g. 15 in FIG. 4) establishes periods during each fo which a normal flow or delivery of lubricant (fluid) should occur though each line. This timing means, for the types of lubrication system shown, would generally comprise a clock-type timer timing out pre-set periods of time and momentarily effecting the energizing relay coil 45 at the termination of each of said periods. Thus, with regard to operation of a system such as illustrated in FIG. 1, wherein the timing means 15 is operable periodically to operate the lubricant pump 5, e.g. for a fifteen-second delivery interval once every hour, delivery should occur for fifteen seconds once every hour. It it does not occur, the red fault light goes on at the end of the fifteen-second interval. The timing means may be regarded as having the dual function of establishing periods of approximately one hour during which a normal delivery should occur, and fifteen-second delivery periods. It will be understood, however, that the invention includes the use of means for establishing periods during each of which a normal flow or delivery of lubricant should occur other than clock-type timers. For example, the invention is applicable to monitoring flow of lubricant through delivery lines to points of lubrication in machinery in which, for example, lubricant is purged through each line by a pump operated by a cam, the cam being operative to actuate each pump during a cycle, the cam in conjunction with suitable electrical controls (e.g., a switch actuated on each revolution of the cam) acting as the means for establishing the periods during which flow should occur through each line.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A system for monitoring flow of fluid in a passage in a fluid distribution system wherien, in normal operation, intermittent deliveries are made through the passage, with off periods of no-flow between said deliveries, said monitoring system being operable to monitor said distribution system to determine whether a delivery has occurred within a period within which a delivery should occur in normal operation, and comprising:

a thermistor in said passage connected in a circuit for being energized and thereby heated, said thermistor being in heat-exchange relation with fluid in said passage so that, on a delivery of fluid through the passage, the thermistor is cooled thereby for increasing its electrical resistance, means for establishing periods during each of which a normal delivery of fluid should occur through the passage, and a monitoring circuit interconnected with the thermistor and said period establishing means having fault signal means therin and means operable in response to occurrence of any of said periods without an increase in the electrical resistance of the thermistor due to cooling of the thermistor in response to a normal delivery of fluid during that period to actuate said fault signal means at the termination of said period, said circuit being conditioned in response to an increase in the electrical resistance of the thermistor due to cooling of the thermistor in each of said periods during which a normal delivery of fluid occurs to refrain from actuating said fault signal means at the termination of said period, said circuit being non-responsive to a decrease in the electrical resistance of the thermistor due to heating of the thermistor.

2. The system of claim 1 wherein said monitoring circuit includes means rendering the circuit generally responsive only to a relatively rapid increase in voltage across the thermistor resulting from a relatively rapid increase in the electrical resistance of the thermistor caused by the delivery of fluid during said period.

3. The system of claim 2 wherein said response means in said monitoring circuit comprises:

memory means settable by said period-establishing means to a first logic state during only part of the period and settable to a second logic state in response to cooling of the thermistor by a normal delivery of fluid during the period and remaining set in the first logic state in the absence of such cooling; logic gate means for actuating said fault signal means in response to conclusion of any of said periods with said memory means remaining set in the first logic state; and wherein said means rendering the circuit generally responsive only to a relatively rapid increase in voltage across said thermistor comprises a capacitor connected between said thermistor and said memory means.

4. The system of claim 3 wherein said response means in said monitoring circuit further comprises:

logic means having an output so connected to said memory means that a change in logic level at the output sets said memory means to its second logic state, said logic means having an input having a threshold voltage at which the output changes in logic level;

said capacitor coupling said thermistor to the input of said logic means; and means for providing to the input of said logic means a voltage sufficiently near in voltage to the threshold voltage that cooling of the thermistor causes the output of said logic means to change in logic level so as to set said memory means to its second logic state.

5. The system of claim 1 wherein said monitoring circuit further includes second signal means for signaling that a normal delivery of fluid has occurred during each period in which a normal delivery does occur, said circuit being conditioned to actuate said second signal means in response to cooling of the thermistor by a normal delivery during said period.

6. The system of claim 5 wherein said response means in said monitoring circuit includes:

memory means settable by said period-establishing means to a first logic state during only part of the period and settable to a second logic state in response to cooling of the thermistor by a normal flow of fluid during the period and remaining set in the first logic state in the absence of such cooling; and means for actuating said second signal means when said memory means is set to the second logic state.

7. The system of claim 5 wherein said monitoring circuit further includes third signal means for signaling that the period-establishing means is acting to establish each of said periods, said fault signal means being actuated in the absence of cooling of the thermistor by a normal delivery of fluid during any period as said third signal means is deactuated on termination of that period.

8. The system of claim 7 wherein said response means in said monitoring circuit includes:

memory means settable by said period-establishing means to a first logic state during only part of the period and settable to a second logic state in response to cooling of the thermistor by a normal delivery of fluid during the period and remaining set in the first logic state in the absence of such cooling; and logic gate means for actuating said third signal means during each period established by said period-establishing means as long as said memory means remains set in the first logic state.

9. The system of claim 7 wherein the signal means are all visual signal means.

10. The system of claim 9 wherein the fault signal means is a red light, the second signal means is a green light, and the third signal means is an amber light.

11. The system of claim 1 wherein fluid is intermittently delivered through the passage by a pump and the period-establishing means is a timing means interconnected with the pump for operating the pump for said periods at timed intervals.

12. The system of claim 11 wherein said monitoring circuit further includes second signal means for signaling that a normal delivery of fluid has occurred during each of said periods in which a normal delivery does occur, said circuit being conditioned or operable to actuate said second signal means in response to cooling of the thermistor by a normal delivery during said period.

13. The system of claim 12 wherein said monitoring circuit further includes third signal means for signaling that the timing means is timing out each period, said fault signal menas being actuated in the absence of cooling of the thermistor by a normal delivery of fluid during any period as said third signal means is deactuated on termination of that period.

14. The system of claim 13 wherein the signal means are all visual signal means.

15. The system of claim 14 wherein the fault signal means is a red light, the second signal means is a green light, and the third signal means is an amber light.

16. The system of claim 1 wherein fluid is intermittently delivered through the passage by a divider valve in a system of divider valves operable in cycles in each of which the divider valves operate one after another in series, and the period-establishing means is a timing means operable to time out periods corresponding to the length of time of the divider valve system cycle so that monitoring of flow in said passage is assured.

17. The system of claim 16 wherein said monitoring circuit further includes second signal means for signaling that a normal delivery of fluid has occurred during each period in which a normal delivery does occur, said circuit being conditioned or operable to actuate said second signal means in response to cooling of the thermistor by a normal flow during said period.

18. The system of claim 17 wherein said monitoring circuit further includes third signal means for signaling that the timing means is timing out each period, said fault signal means being actuated in the absence of cooling of the thermistor by a normal flow of fluid during any period as said third signal means is deactuated on termination of that period.

19. The system of claim 18 wherein the signal means are all visual signal means.

20. The system of claim 19 wherein the fault signals means is a red light, the second signal means is a green light, and the third signal means is an amber light.

* * * * *